June 28, 1966  M. KRAUS  3,258,761

DIFFERENTIAL ANNUNCIATOR

Filed July 10, 1962  3 Sheets-Sheet 1

INVENTOR:
MURRAY KRAUS
BY
Howson & Howson
ATTYS.

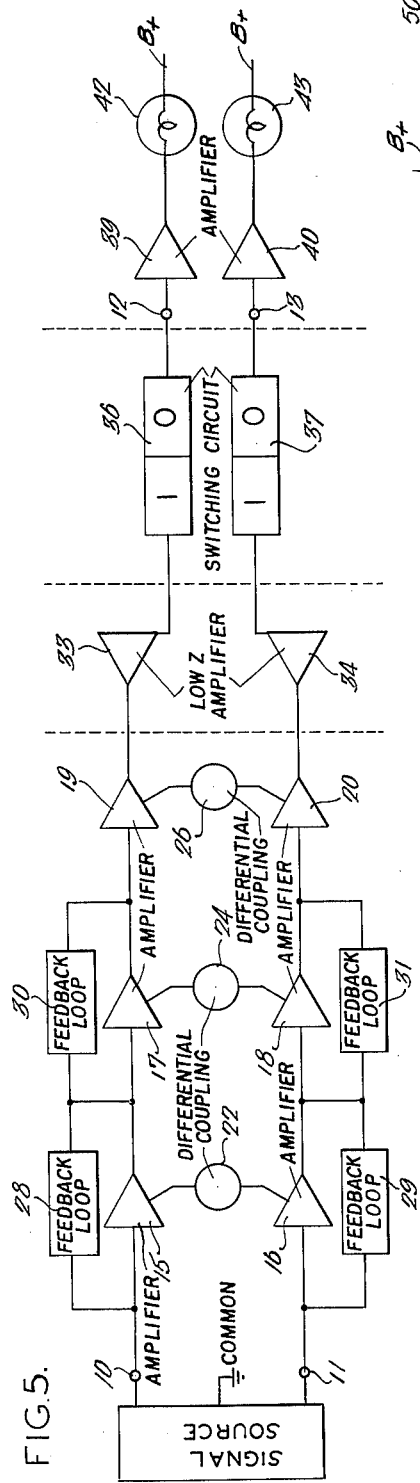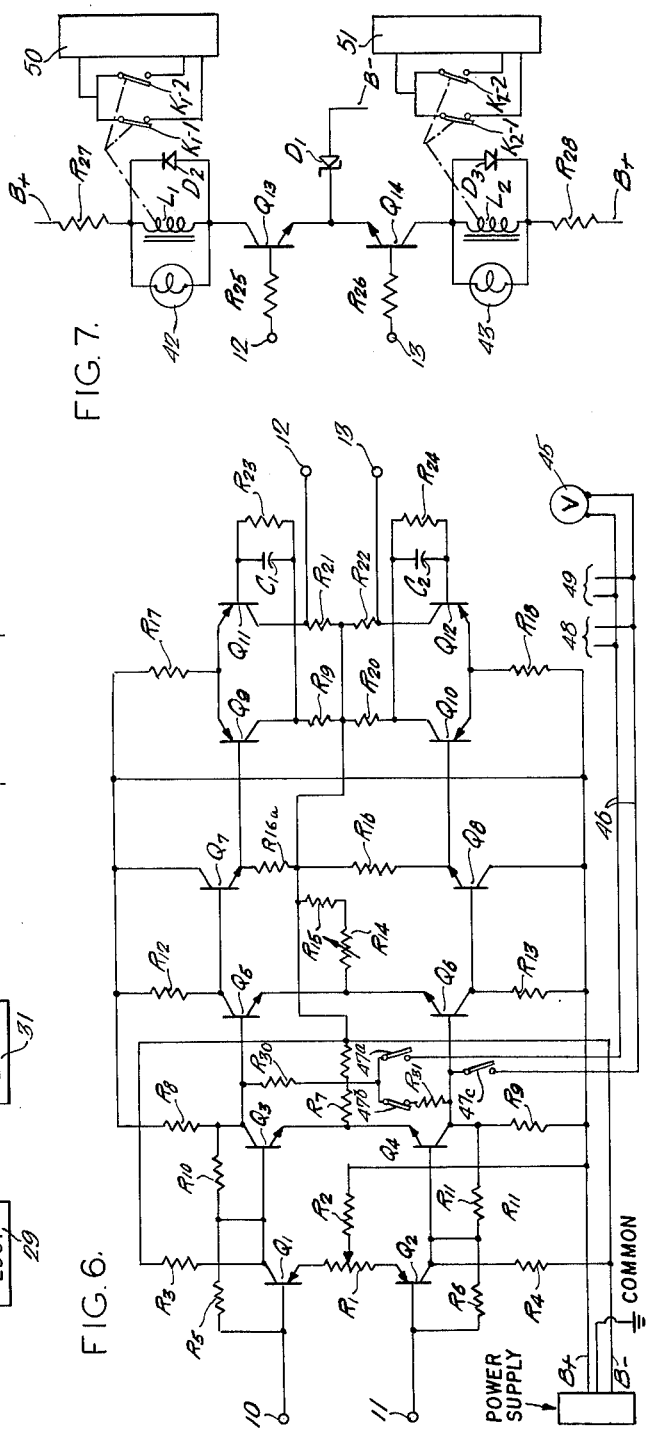

June 28, 1966  M. KRAUS  3,258,761
DIFFERENTIAL ANNUNCIATOR
Filed July 10, 1962  3 Sheets-Sheet 3

INVENTOR:
MURRAY KRAUS
BY
Howson & Howson
ATTYS.

United States Patent Office 3,258,761
Patented June 28, 1966

3,258,761
DIFFERENTIAL ANNUNCIATOR
Murray Kraus, Levittown, Pa., assignor to CompuDyne Corporation, Hatboro, Pa., a corporation of Pennsylvania
Filed July 10, 1962, Ser. No. 208,825
15 Claims. (Cl. 340—248)

The present invention relates to an annunciator point or unit which may be used alone or in conjunction with other annunicator points, preferably of the same type. This annunciator point or unit is responsive to range or bands of a signal source which may be a voltage or current source or even other sources such as a resistance source, whether internally or externally generated. More specifically, the present invention relates to an annunciator point which, over certain ranges of the signal source, will indicate a normal or no alarm condition and, over other ranges, will indicate an abnormal or alarm condition.

There are certain situations in which it is desirable to know not whether or not an event has occurred which will open or close a switch, but whether a condition exists in the monitored location which is within a particular range. Means for converting voltages, currents, resistance values and such signals to such a switching operation to operate a conventional annunciator may consume a considerable amount of power and may be less accurate than desirable. Furthermore, it may be desirable to provide adjustment so that the range selected for operation may be changed in accordance with the dictates of changing conditions or requirements.

The annunciator of the present invention enables various signal sources such as current or voltage levels or resistance values to be used directly to indicate a normal or abnormal operation depending upon whether the signal is within a selected range or ranges or outside of that range or ranges. The present invention contemplates use, not only in direct voltage and current situations but in temperature situations where voltage effects may be generated by thermocouples or the like or other situations where transducer or translating elements of simple nature may be employed to obtain voltage or current levels.

In accordance with the present invention, two general types of situations are contemplated, one in which there are only two possible ranges of operation, an alarm range and a no-alarm range, and the other in which similar ranges, either alarm or no-alarm bracket the range representing the opposite condition. Voltage situations are typical and may be considered by way of example. The first type of situation conventionally might be one in which no alarm would be desired until a voltage exceeded a predetermined amount and stayed in a range above that amount. The opposite situation is also possible, i.e., one in which a voltage is normally above a certain level but when it falls off below that level it causes an alarm situation. The other possibility is one where there is a middle range of alarm and operation of either side of that middle range is satisfactory but moving into the alarm range from either side is undesirable. Conversely, there may be a situation in which a middle range is safe for operation but moving to either side may result in an alarm. The present invention permits all of these combinations and permits selection of the desired combination if comprehensive point circuitry is employed.

In accordance with the present invention, these effects are accomplished by the use of a one or more stage differential amplifier preferably employing local feedback, followed by an impedance decoupling device which couples yet isolates the amplifier from a switching unit. The outputs of the switching unit are, in turn, used to control signal elements.

In a preferred arrangement, the differential amplifier consists of a multiple stage device, each stage of which consists of a pair of active element devices having its own local feedback. Between the active element devices is a connection. In at least one stage this connection may take the form of a resistor coupling providing a voltage divider to which voltage is applied by an adjustably positioned tap to permit adjustment of the desired operating point. Alternatively, or in another stage, the connection consists of a simple conductor to which is connected one end of a variable resistance which enables adjustment of the dead space, or band, between active bands on either side. The differential amplifier is isolated from the switching unit by a cathode follower, an emitter follower, or similar device. The switching circuit may be some conventional arrangement such as a Schmidt circuit.

For a better understanding of the present invention, reference is made to the following drawings, in which:

FIG. 5 is a schematic block diagram showing a point of the differential annunciator in accordance with the present invention;

FIG. 6 is a circuit diagram showing a preferred solid state embodiment of the present invention;

FIG. 7 is a circuit diagram showing the output circuitry in accordance with the present invention;

Figure 1:
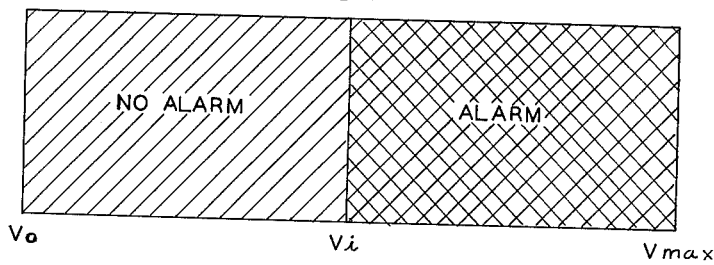
FIG. 1 is a linear voltage diagram showing adjacent voltage ranges in which no-alarm and alarm may occur.

Referring first to FIG. 1 which represents a situation in which adjacent ranges of voltage are involved, it will be appreciated that these could as well be currents and that instead of calibration in volts or amperes, calibration might more usually be in some other units. The total range of surveillance may be from $V_0$ to $V_{max}$. At some predetermined voltage $V_i$ within this range, the transition from a no-alarm to an alarm condition takes place. For example, in the use of a thermocouple, as long as a voltage is in the range between $V_0$ and $V_i$, the temperature monitored is not harmful, but when the temperature produces a voltage exceeding $V_i$, the temperature may be such as to cause a fire or do damage to the installation being monitored. It may be desirable from time to time to adjust the voltage of $V_i$, first, because different types of thermocouples may need different voltage calibration and, second, because different temperatures may be tolerated in different situations.

Figure 2:
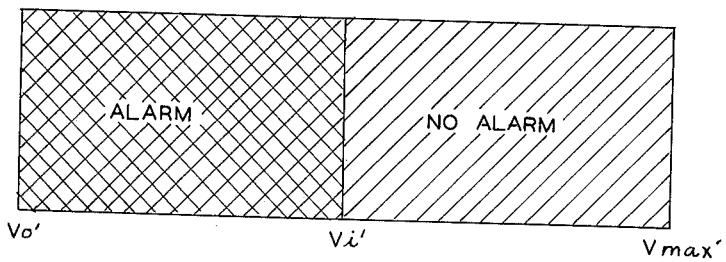
FIG. 2 is a similar voltage diagram showing a reversal of alarm and no-alarm ranges.

FIG. 2 represents the alternative situation in which the voltage is normally high and, when it drops off, an alarm condition arises. Here the alarm condition or no-alarm condition is represented as arranged between $V_i'$ and $V_{max}'$, and the alarm condition is below $V_i'$ down to $V_0'$. Illustrative of the situation is one where a variable voltage may be employed to maintain a desired condition but if that voltage falls below $V_i$, the conditions cannot be maintained. Again, it may be desirable to adjust the position of $V_i'$ for the same reasons.

Figure 3:
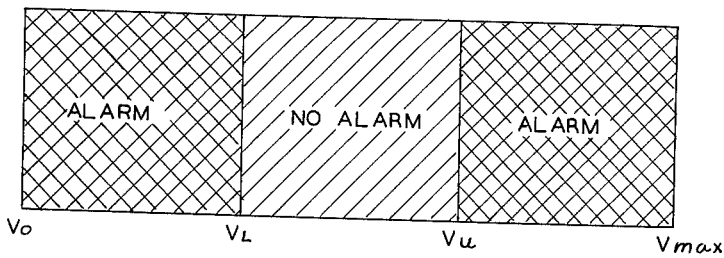
FIG. 3 is a similar voltage diagram but showing the situation in which a no-alarm range of voltage is bracketed by alarm ranges.

FIG. 3 represents a slightly different situation in which $V_0$ and $V_{max}$ represents extremes of the possible ranges of voltage and in which the operation being monitored normally has a safe voltage range from $V_L$ to $V_u$ (representing the lower and upper limits of safe operation, respectively). If the voltage drops below $V_L$ into the range of $V_L$ to $V_0$, an alarm will sound. Likewise, if the voltage rises above $V_u$ into the range between $V_u$ and $V_{max}$, an alarm will sound. An example of this situation might be chemical processing in which a particular range of temperature must be maintained, the temperature again represented by voltage. If the temperature exceeds or falls below the middle range, the process may be entirely ruined.

Figure 4:
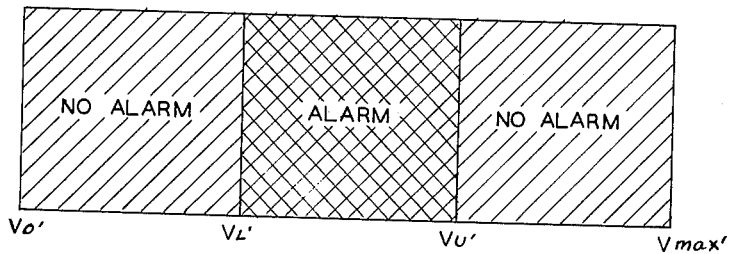
FIG. 4 is a linear voltage diagram similar to FIG. 3 in which an alarm range is bracketed by no-alarm ranges.

By contrast, the arrangement of FIG. 4 represents a situation in which there is an intermediate forbidden range. For example, in monitoring particles in a reactor, particles within a given intermediate range may represent a danger whereas particles of greater or lower velocity which may be represented by voltages above and below voltages representing the intermediate velocity represent no danger. In this situation, as in the situation of FIG. 3, it is desirable to change the values $V_L$ and $V_u$ or $V_L'$ and $V_u$ to extend the range or to change the position of the range relative to $V_0$ and $V_{max}$. This can be done in accordance with preferred embodiments of the present invention.

Referring now to FIG. 5, it will be seen that the annunciator of the present invention has input terminals 10 and 11 to which voltages may be applied and output terminals 12 and 13 to which alarm devices, such as lights, horns or buzzers, may be connected. The input state of the device employs three stages of direct coupled differential amplifiers wherein amplifiers 15 and 16 constitute the first differential amplifier stage, amplifiers 17 and 18 constitute the second differential amplifier stage and amplifiers 19 and 20 constitute the third differential amplifier stage. Each stage has its pair of amplifiers D.C. connected together in differential fashion by means 22, 24 and 26, respectively, the nature of which coupling will be treated in greater detail hereafter. Also, at least the first two stages of amplification are preferably provided with local feedback through feedback elements 28, 29, 30 and 31 for stabilization purposes.

The highly amplified D.C. outputs from the differential amplifiers are fed through the coupling elements 33 and 34 which may be low impedance amplifier units to appropriate switching circuits 36 and 37, respectively. Signals of the switching circuits 36 and 37 are fed to amplifiers 39 and 40 and the outputs of these amplifiers are, in turn, connected to annunciator alarm indicators 42 and 43, here incandescent lamps.

A typical circuit of the differential amplifier through the switching circuit is seen in FIG. 6. FIG. 6 shows a circuit having B+ and B− voltage supplies of equal and opposite amounts, for example plus and minus 11 volts. The reference potential relative to which B+ and B− are measured is a common or ground, the same common or ground as shown in connection with the signal source in FIG. 5. The common or ground is provided normally at the power supply, as shown, by conventional techniques well known in the art. The voltage signal input is applied to terminal 10 to zero reference of power supply, to terminal 11 and the zero reference or across terminals 10 and 11 depending upon the particular desired effect. The first stage of the differential amplifier consists of PNP transistors $Q_1$ and $Q_2$, for example, of the type of 2N1027 whose bases are coupled to input terminals 10 and 11, respectively. The emitters of these transistors are connected through resistor $R_1$ which is preferably a voltage divider resistor whose movable tap is connected through resistor $R_2$ to the B+ terminal. The collectors of transistors $Q_1$ and $Q_2$ are connected through their respective load resistors $R_3$ and $R_4$ to the B− bus and the collectors are also connected back to the base by feedback loops including resistors $R_5$ and $R_6$, respectively. The collectors of transistors $Q_1$ and $Q_2$ are direct coupled to the bases of transistors $Q_3$ and $Q_4$, respectively. Transistors $Q_3$ and $Q_4$ are preferably NPN transistors, for example, of type TI–495. Their emitters are direct coupled and their collectors are coupled by load resistors $R_8$ and $R_9$ which are connected to the B+ terminal. The collectors are also connected back to the base of transistors $Q_3$ and $Q_4$ by feedback paths containing resistors $R_{10}$ and $R_{11}$, respectively.

The collectors of transistors $Q_3$ and $Q_4$ are direct coupled to the bases of transistors $Q_5$ and $Q_6$, respectively. Transistors $Q_5$ and $Q_6$ are preferably NPN type transistors of the same type as transistors $Q_3$ and $Q_4$ and have their emitters directly connected together and to one end of a line connected to the common emitter connection of transistors $Q_7$ and $Q_8$, to be described through resistor $R_7$. The remote end of resistor $R_7$ is also connected to a circuit bronch consisting of potentiometer $R_{14}$ and fixed resistance $R_{15}$ connected to a common emitter connection of transistors $Q_5$ and $Q_6$. Load resistors $R_{12}$ and $R_{13}$ couple the collectors of transistors $Q_5$ and $Q_6$, respectively, to the B+ potential source, They have their collectors directly connected to the bases of transistors $Q_7$ and $Q_8$, respectively, said transistors providing an emitter follower arrangement for providing a low impedance coupling between the differential amplifier and the trigger circuit. The emitters of these NPN transistors, preferably type 2N1302, are resistance coupled by resistors $R_{16}$ and $R_{16a}$ and between the resistances $R_{16}$ and $R_{16a}$ are the resistance connections from the common emitter connections of the last two amplifier stages. The collectors are directly connected to B+. The emitters are coupled to the bases of transistors $Q_9$ and $Q_{10}$ which are PNP types, preferably 2N1303. These transistors are coupled with similar type transistors $Q_{11}$ and $Q_{12}$, respectively, by common emitter connections which connections are connected through biasing resistors 17 and 18, respectively, back to the B+ buses. The collectors of transistors $Q_9$ and $Q_{10}$ are connected through resistors $R_{19}$ and $R_{20}$ and the collectors of transistors $Q_{11}$ and $Q_{12}$ are connected through resistors $R_{21}$ and $R_{22}$. The collector of transistor $Q_9$ is also connected to the base of transistor $Q_{11}$ through resistor $R_{23}$ and bypass capacitor $C_1$ and similarly the collector of transistor $Q_{10}$ is connected to the base of transistor $Q_{12}$ through resistor $R_{24}$ and bypass capacitor $C_2$. This connection provides a modified Schmidt circuit which is conductive at a particular voltage range and the arrangement of the circuit makes the trigger circuit of transistors $Q_{10}$ and $Q_{12}$ sensitive to a particular positive voltage range whereas transistors $Q_9$ and $Q_{11}$ are sensitive to a particular negative voltage range. Output from the circuit is taken across resistors $R_{21}$ and $R_{22}$ from the collector of transistors $Q_{11}$ and $Q_{12}$, respectively. Resistors $R_{19}$ and $R_{20}$ and resistors $R_{21}$ and $R_{22}$ have an intermediate connection which is connected back to the common emitter circuits of the last two stages of the amplifier and the emitter follower.

FIG. 7 shows a terminating circuit which may be used with the circuit of FIG. 6. The terminals 12 and 13 may be seen to be coupled through resistors $R_{25}$ and $R_{26}$ to the bases of transistors $Q_{13}$ and $Q_{14}$, respectively. The transistors $Q_{13}$ and $Q_{14}$ are NPN transistors preferably of the type 2N1302 and are connected by a diode $D_1$ of the Zener 1N3016 to the B− terminal, the Zener diode providing a 6.8 voltage drop. The collectors from transistors $Q_{13}$, $Q_{14}$ pass, respectively, through similar circuits. These circuits each include a lamp 42 or 43, a relay winding $L_1$ or $L_2$ and a diode $D_2$ or $D_3$. The lamps are 12 volt lamps, the relays are preferably of the C. P. Clore and Co. type HGSM1010 and the diodes are preferably IN457. The load is completed through a suitable resistor $R_{27}$ or $R_{28}$ to B+ terminals at each end. The relays provide switch contacts external to the annunciator circuit which may be used in a control circuit to control appropriate circuitry 50 and 51. The switch contacts of relay $L_1$ may be normally closed contacts $K_1$-1 and normally open contacts $K_1$-2 in a class C connection providing a single-pole double-throw effect available for connection in the circuitry of circuit 50. Similarly the contacts of relay $L_2$ may be $K_2$-1 for the normally closed $K_2$-2 for the normally open contacts connected in the same way and form part of circuit 51. It will be appreciated, in a given instance, the specific configuration of contacts provided may vary just as the control circuits 50 and 51 may vary.

The capacitors used are preferably .1 microfarad and a table of resistor values is given below:

| | |
|---|---|
| $R_3$ | 22K |
| $R_4$ | 22K |
| $R_5$ | 100K |
| $R_6$ | 100K |
| $R_7$ is the sum of 5.6 and 1.5 or 7.1K | |
| $R_8$ | 22K |
| $R_9$ | 22K |
| $R_{10}$ | 100K |
| $R_{11}$ | 100K |
| $R_{12}$ | 22K |
| $R_{13}$ | 22K |
| $R_{15}$ | 2.7K |
| $R_{16}$ | 5.6K |
| $R_{16a}$ | 5.6K |
| $R_{17}$ | 270 |
| $R_{18}$ | 270 |
| $R_{19}$ | 3.9K |
| $R_{20}$ | 3.9K |
| $R_{21}$ | 3.9K |
| $R_{22}$ | 3.9K |
| $R_{23}$ | 10K |
| $R_{24}$ | 10K |

Resistor $R_1$ is 250 to 1000 ohms as required and resistor $R_{14}$ is 5K to 10K ohms as required.

Figure 8:
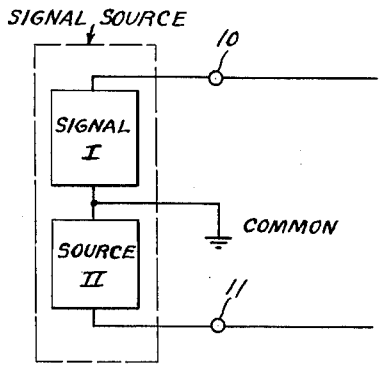
FIG. 8 is a schematic representation of a double ended signal source such as might be applied to the circuit of FIG. 5.
Figure 9:
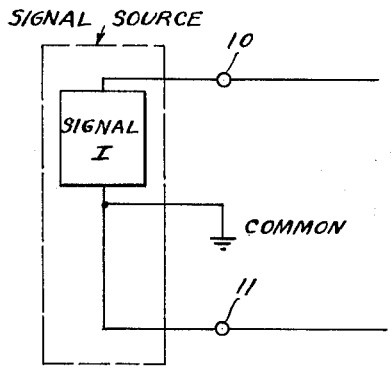
FIG. 9 is a schematic representation of one type of single ended signal source which might be used with the circuit of FIG. 5.
Figure 10:
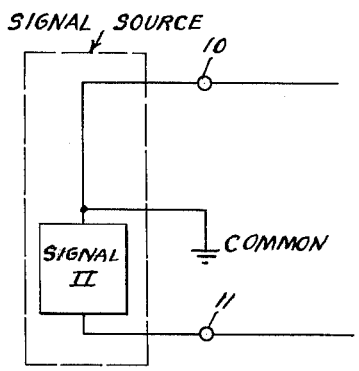
FIG. 10 is a schematic diagram of an alternative single ended signal source which might be used with the circuit of FIG. 5.

In operation, an input signal from a resistive source or thermal produced E.M.F. is applied to the input terminals in a single ended or differential manner. If two inputs are applied as shown in FIG. 8 and response is desired of both, then one of the signals should be applied from each of the respective terminals 10 and 11 to the common bus. If used in single ended, one signal configuration as shown in FIGS. 9 and 10, on the other hand, the fixed reference amplifier of each stage should be terminated to the common bus by direct connection, as shown, or preferably with a resistance approximately equal to the input resistance at the input of the amplifier used. In each case the operation is the same. In each case the amplifiers on each side of the circuits amplify the signals fed to them whether the particular signal is a fixed level common potential or a variable signal, and the output of each amplifier stage or pair is a difference signal.

The resistor $R_1$ serves two functions. It is used to adjust the desired operating point and offset errors. It is also used to compensate for differences of input semiconductors $Q_1$ and $Q_2$. By adjusting of the potentiometer $R_1$, the amplifier excursion can be centered about zero or at some predetermined setting other than zero. In the particular amplifier described specifically, the amplification of three stages is in excess of 50K. The entire amplifier is operated at full amplification with no adjustments other than the null set to change sensitivity. This type of operation helps to minimize gray areas occurring in the digital portion of the circuitry. The resistor $R_{14}$ controls the width of the variable dead band corresponding to the voltages $V_L$ and $V_U$ in FIGS. 3 and 4. Thus, a potentiometer $R_{14}$ adjusts the $V_L$ and $V_U$ positions simultaneously moving them toward and away from one another. The $V_i$ position in the system of FIGS. 3 and 4 may be considered an intermediate point between voltages $V_L$ and $V_0$ and may also be adjusted up and down by adjustment resistor $R_1$.

It will be clear to those skilled in the art that some sort of input or power supply circuit may precede the differential amplifiers but that the signal applied to the terminal 10 or 11 or across the terminals 10 and 11 is proportional to the signal from the source being monitored. In general the voltage applied at terminal 10 may be described as $E_1$ whereas the voltage applied at terminal 11 is described as $E_2$. For example, when an input signal on the order of 10 to 50 milliamperes is applied through a 100 ohm resistance with proper polarity, a resultant signal voltage for the circuit described above will occur and may be described as $E_1$–$E_2$. With the voltage $E_1$ applied to transistor $Q_1$ and $E_2$ applied to transistor $Q_2$ the collector sum of voltages across these amplifiers then becomes $(E_2$–$E_2)$ $ure_1$ at the set operating point, where $ure$ represents the reverse voltage gain. The sum across the collectors of the next stage, i.e., transistors $Q_3$ and $Q_4$, then results in an output of $(E_1$–$E_2)$ $ure_1$, $ure_2$. This same approach follows through additional stages of amplification.

For example, the resettability of the system described has been typically shown to be approximately .5 percent. The output range is 1 to 5 volts D.C. across a 100 ohm resistor and the relay contacts are rated at 2 amperes for a resistor load.

In practical situations it is frequently desirable to employ a meter circuit so that, instead of merely having alarm readout, it is possible to know where in the indicated range the monitored signal may be. For this purpose a meter circuit is provided across the collectors of transistors $Q_3$ and $Q_4$ although it could equally well be located elsewhere. A single meter 45 is employed and is connected in series with resistor $R_{30}$ across the collectors of transistors $Q_3$ and $Q_4$ by leads 46. Also in series with these leads is one pole 47a of a triple pole switch 47a, 47b, 47c. The other pole 47b connects resistor $R_{31}$ with meter 45 and in series with resistor $R_{30}$ across the collectors of transistors $Q_3$ and $Q_4$. $R_{31}$ is selected to have a resistance on the order of the meter resistance and $R_{30}$ is selected to have a resistance of proper size to cause the signals applied to the meter 45 to cause it to read properly for its calibration through pole 47c. Preferably a safety feature such as additional lock-out contacts 47c may be used in a lock-out system to other circuits to assure that when one switch such as 47a, 47b is actuated to put the meter 45 in its particular circuit similar contacts in other circuits cannot be actuated, even if their push-button or other actuator is touched. The common calibration is necessary because meter 45 may be used for other similar annunciator points which may be represented by leads 48 and 49 which selectively connect the meter 45 into their circuit in the same way leads 46 do in the annunciator circuit shown. Contacts 47a are normally open whereas contacts 47b are normally closed and the switch is preferably a make before break switch may be actuated by a push-button or like device to place the meter in the circuit. The meter 45 may be calibrated, for example, in terms of temperature of whatever other parameter is being monitored. By the use of multiple scales and calibrating resistors similar to resistor 30, it is possible to use the same meter to measure multiple parameters such as voltage, current, temperature, etc., monitored at a number of points.

Although a specific embodiment of the present invention has been described, it will be clear to those skilled in the art that many modifications are possible. All such modifications within the scope and spirit of the claims are intended to be within the scope of the present invention.

I claim:

1. A differential annunciator comprising a signal source capable of producing an electrical signal having a value in a range of no alarm condition or in an adjacent range of alarm condition, indicator means, coupling means coupling said indicator means to said signal source including a trigger circuit operable to actuate said indicator means in one manner when the signal is in the range of alarm condition and to actuate said indicator means in another manner when the signal is in the range of no alarm condition. at least one stage of differential amplifier provided with single stage feedback and having two inputs connected to said signal source and having two outputs, and an impedance decoupling circuit connected between said differential amplifier outputs and said trigger circuit, whereby when signals enter the range of alarm condition they actuate the trigger circuit so as to energize the indicator means.

2. The differential annunciator of claim 1 in which for the signal source employed there are two ranges of one kind bracketing a range of the other kind and the signal source is connected between both of a pair of terminals providing the input of the differential amplifier.

3. The differential annunciator of claim 2 in which the amplifier includes separate output terminals which are coupled through separate impedance decoupling means to separate trigger circuits such that a signal crossing the boundary between the upper and intermediate ranges will actuate one and the signal crossing the boundary between the lower and intermediate ranges will actuate the other.

4. The differential annunciator of claim 3 in which the trigger circuits are arranged to energize the respective indicator means as the signal level changes from the intermediate range to one of the other ranges, the indicator means indicating whether to the lower or upper range.

5. The differential annunciator of claim 3 in which the trigger circuits are arranged to energize the respective indicator means as the signal level changes from the lower range to the intermediate or from the upper to the intermediate, the indicator means indicating which one of the two possibilities is involved.

6. The differential annunciator of claim 3 in which each stage of the differential amplifier consists of a pair of active elements with a conductive connection between them and a variable resistor is connected between this connection and a connection between corresponding element in the separate trigger circuits whereby as said resistance is varied the size of the intermediate range changes.

7. The differential annunciator of claim 3 in which the conductive connection is provided between each stage of the differential amplifier and includes in at least one stage a resistor having a movable tap said tap being connected through a biasing resistor to a D.C. potential supply whereby as the tap is repositioned the intermediate range is shifted up or down so that both upper and lower boundaries change.

8. The differential annunciator of claim 1 in which for the signal source employed there are only two adjacent ranges of concern, an alarm and a no alarm range and the signal source is connected directly to one of the inputs and through a fixed potential to the other of said inputs.

9. The differential annunciator of claim 8 in which the other terminal has an impedance connected between it and said fixed potential to balance the signal source, and the trigger stage consists of at least a trigger circuit connected to the impedance decoupling means which takes the output of that side of the amplifier to which input is fed.

10. The differential annunciator of claim 9 in which the trigger circuit is arranged to energize the indicator means as the signal passes from the lower into the higher range.

11. The differential annunciator of claim 9 in which the trigger circuit is arranged to energize the indicator means as the signal passes from the higher into the lower range.

12. The differential annunciator of claim 8 in which the stages of the differential amplifier each consist of a pair of active elements with some connection between them including in at least one stage a resistor having a movable tap said tap being connected through a biasing resistor to a D.C. potential supply whereby as the tap is repositioned the dividing line between the alarm and no alarm ranges is varied.

13. The differential annunciator of claim 1 in which a meter circuit is provided which connects a meter into the annunciator circuit to measure the actual level of the signal.

14. The differential annunciator of claim 13 in which the meter circuit is shared by other points and means is provided in each circuit that only one circuit is metered at a time.

15. The differential annunciator of claim 14 in which the meter is located across points producing a voltage proportional to the signal source output and includes a calibrating resistance in series with the meter and a resistance equivalent to the meter resistances in parallel with the meter and a triple pole switch which connects in the meter as the equivalent resistance is switched out.

References Cited by the Examiner

UNITED STATES PATENTS

| | | | |
|---|---|---|---|
| 2,473,457 | 6/1949 | Tyson | 328—146 |
| 3,003,113 | 10/1961 | MacNichol | 330—69 |
| 3,039,024 | 6/1962 | Spooner | 328—146 X |
| 3,042,876 | 7/1962 | Pegram | 330—30 X |

FOREIGN PATENTS 620,712   5/1961   Canada.

OTHER REFERENCES

Reference Data for Radio Engineers, 4th ed. N.Y., I.T.&T., 1960, pp. 446–447.

NEIL C. READ, *Primary Examiner.*

R. M. ANGUS, *Assistant Examiner.*